United States Patent [19]

Hoffmann et al.

[11] Patent Number: 4,527,442
[45] Date of Patent: Jul. 9, 1985

[54] MANUAL TRANSMISSION SHIFTING MECHANISM

[75] Inventors: Erwin Hoffmann, Bergheim; Josef Schneider, Wesseling Berzdorf, both of Fed. Rep. of Germany

[73] Assignee: Ford Motor Company, Dearborn, Mich.

[21] Appl. No.: 443,841

[22] Filed: Nov. 22, 1982

[30] Foreign Application Priority Data

Dec. 3, 1981 [DE] Fed. Rep. of Germany ....... 3147782

[51] Int. Cl.³ .................. B60K 41/26; G05G 5/10; G05G 9/12
[52] U.S. Cl. .................. 74/411.5; 74/477; 192/4 C
[58] Field of Search ............ 74/411.5, 477; 192/4 A, 192/4 C

[56] References Cited

U.S. PATENT DOCUMENTS

| 4,192,410 | 3/1980 | Poirier ................ | 192/4 C X |
| 4,221,283 | 9/1980 | Nordkvist et al. .......... | 192/4 C |
| 4,257,284 | 3/1981 | Ashauer et al. ........... | 192/4 C X |
| 4,294,338 | 10/1981 | Simmons ............ | 74/4115 X |
| 4,430,904 | 2/1984 | Fogelberg ............ | 192/4 A X |

FOREIGN PATENT DOCUMENTS 2319397 10/1974 Fed. Rep. of Germany.

Primary Examiner—Allan D. Herrmann
Attorney, Agent, or Firm—Frank G. McKenzie; Olin B. Johnson; Clifford L. Sadler

[57] ABSTRACT

A shifting mechanism for reverse drive that slows the input shaft of a manual transmission in which a reverse gear wheel is shifted into engagement with reverse drive gearwheels disposed on a constant mesh gear and an output shaft. In order to slow the input shaft with the clutch disconnected, a shift fork is located on a rotatable and displaceable gear selector shaft that carries a shift finger and shift forks displaceably thereon. The shift fork is axially displaceable against the force of a spring relative to a bracket arm connecting the fork to the shift finger. An axial cam cooperates with an inclined portion of the shift fork and two radial arms contact stop surfaces on the housing cover and on an arm of the shift fork.

5 Claims, 2 Drawing Figures

MANUAL TRANSMISSION SHIFTING MECHANISM

BACKGROUND OF THE INVENTION

1. Field of the Invention

This invention relates to a shifting mechanism for a manual transmission, and more particularly to such a mechanism that slows the input shaft of the transmission when reverse drive is selected.

2. Description of the Prior Art

A shifting device of the type described here is known from the German Patent No. 23 19 397. In the mass-produced embodiment of this shifting mechanism it has been found that the tolerances normally occurring on the various cooperating components cause the mechanism to function objectionably. An object of the invention is to improve the shifting mechanism of this type so that the desired function may be assured independently of the tolerances.

This object is realized in a transmission made according to this invention in that the shift mechanism includes a shift pin holder that has an axial cam which moves on an inclined surface of a shift fork, and two arms that contact stop surfaces formed on the gear box cover and a stop surface on the shift fork. On account of the resilient connection between the shift fork and its bracket arm there is no cross-shifting or withdrawal of the fourth gear caused by the spring in travel.

BRIEF DESCRIPTION OF THE DRAWING

The invention is explained with reference to an embodiment illustrated in the accompanying drawings.

DESCRIPTION OF THE PREFERRED EMBODIMENT

Figure 1:
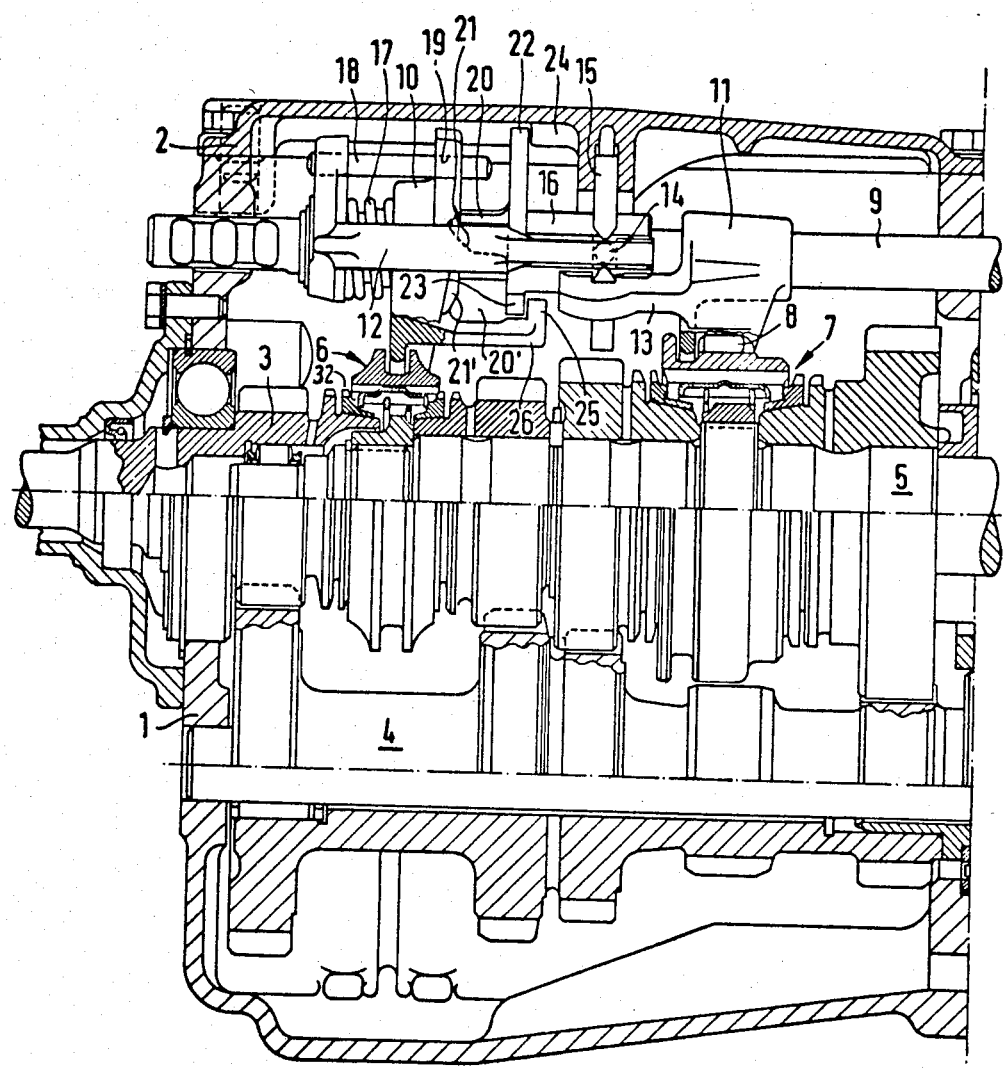
FIG. 1 is a vertical partial cross section through a manual transmission having a shifting mechanism made according to this invention.

The housing of a motor car manual transmission includes a gear box housing 1 and a gear box cover 2. An input shaft 3, a constant mesh gear 4 and an output shaft 5 are arranged in the gear box housing 1. Synchromesh units 6 and 7 for shifting the fourth and third gears or the second and first gears, respectively, are mounted on the output shaft 5. The outer surface of the synchromesh unit 7 is formed with gear teeth, which are brought selectively into engagement with other portions of the reverse drive system.

The two synchromesh units 6 and 7 are actuated by way of shift forks 10 and 11, which are slidably carried on a gear selector shaft 9. In a manner similar to that described in German patent 23 19 397, shift forks 10 and 11 are provided with bracket arms 12 and 13, in which grooves are formed that are engaged selectively by a shift finger 14 and a locking wheel 15 to select a shift fork when there is a corresponding preselection rotation of selector shaft 9. Shift finger 14 is formed on a shift finger holder 16 which is rigidly connected to selector shaft 9. Locking wheel 15 is fixed against axial displacement on housing 1; it operates to permit engagement of finger 14 in the selected fork groove and to prevent axial displacement of the unselected shift fork. Shift fork 10 is axially displaceable relative to its bracket arm 12 against the force of a spring 17, but it is prevented from rotating by means of pin 18 which is fixed to arm 12 and fitted within bore 19 formed in fork 10. The shift finger holder 16 is provided with a first cam 20, which cooperates with an inclined surface 21 on the shift fork 10.

In the application of a shifting device of this type in mass-produced manufacture it has been found that the tolerances which necessarily occur may result in undesired shifting characteristics. Thus in the case of large tolerances in the region of locking wheel 15 an undesired cross-shifting could occur as a result of the pressure of the spring 17. Similarly, the pressure of the spring 17 can cause an undesired disengagement of gear 3 from output shaft 5.

In order to avoid defective shifts, shift finger holder 16 is provided according to the invention with two radial arms 22 and 23. Arm 22 cooperates with a stop 24 on gear box cover 2 and arm 23 cooperates with a stop surface 25 on an arm 26 of shift fork 10 in order to prevent spring 17 from operating in an undesired manner.

Figure 2:
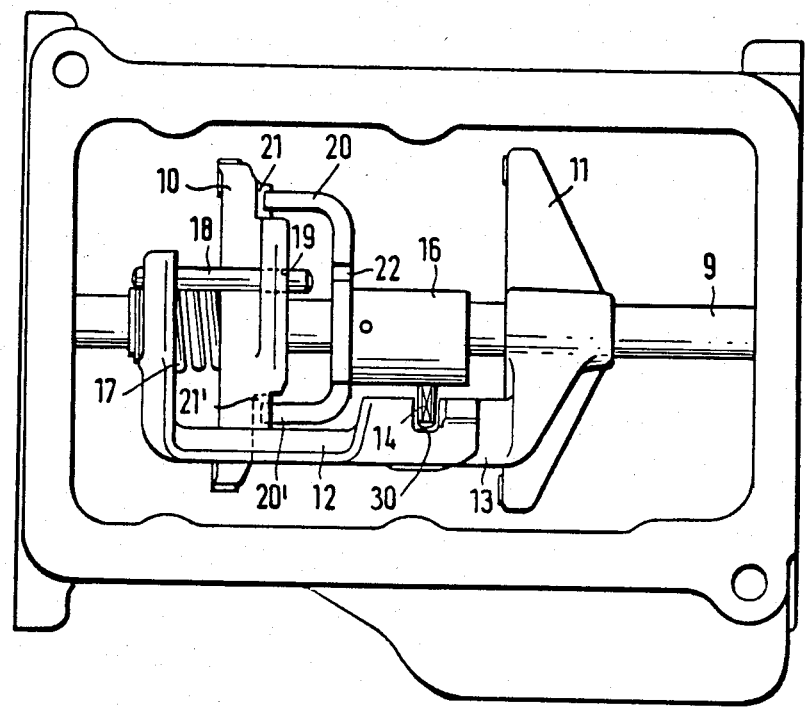
FIG. 2 is a top view of the shifting mechanism of FIG. 1 with the gear box cover removed.

In order to act upon the shift fork 10 in a uniform manner, a second cam 20' disposed diametrically opposite cam 20 and cooperating with a corresponding second inclined surface 21' on shift fork 10, as indicated by broken lines in FIG. 2, may be provided on the shift pin holder 16.

Reverse drive operation is selected by rotating selector shaft 9 clockwise (when viewed from the right-hand side of FIG. 1) out of groove 30 on bracket arm 12. This rotation moves first cam 20 downward against the inclined surface 21 and moves cam 20' upward on the second inclined cam surface 21'. The camming action produced by this movement forces shift fork 10 leftward on selector shaft 9 and carries the sleeve of synchronizer 6 leftward into contact with blocker ring 32. Ring 32 is mounted on a conical surface of gear 3; therefore, as the ring is moved leftward, the mating conical surfaces produce frictional contact, which causes gear 3 on the input shaft to be slowed. Gear 3 on the input shaft is in continuous meshing engagement with a gear on countershaft 4. Therefore, as the input shaft is slowed by the shifting action of selector shaft 9 to the reverse position, the reverse pinion on the countershaft is slowed, and the sliding reverse drive gear can be brought easily into engagement with reverse output gear 8 and the reverse pinion.

Having described a preferred embodiment of our invention, what we claim and desire to secure by U.S. Letters Patent is:

1. A gear shift mechanism for a manual transmission comprising:
    an input shaft carrying a synchronizing ring of a synchronizer unit adapted to apply a braking force to the input shaft as the synchronizing ring is moved against the input shaft;
    a locking wheel fixed against axial displacement;
    a gear selector shaft mounted for rotation and axial displacement having at least one selector finger, a first cam and radial arms extending outwardly therefrom;
    a shift fork for moving the synchronizing ring, mounted on the gear selector shaft for axial displacement, having a surface engageable by the first cam whereby the shift fork is moved axially and the synchronizing ring is moved against the input shaft as the gear selector shaft is rotated to the reverse drive position;

a bracket arm mounted on the gear selector shaft, resiliently forced axially away from the shift fork, having a groove located for selective engagement by the selector finger and the locking wheel, thereby permitting axial displacement of the bracket arm if the selector finger engages the groove and prohibiting axial displacement of the bracket arm if the locking wheel engages the groove; and stop means with which the radial arms of the gear selector shaft make contact for limiting the extent of axial displacement of the gear selector shaft.

2. The mechanism of claim 1 further including:

a second cam located diametrically opposite the first cam carried on the gear selector shaft; and a second surface formed on the shift fork engageable by the second cam as the gear selector shaft is rotated to the reverse drive position, whereby the shift fork is moved axially and the synchronizing ring is moved against the input shaft to brake the input shaft.

3. The mechanism of claim 1 wherein the input shaft is in continuous meshing engagement with a countershaft on which multiple gear wheels are formed, one gear wheel being a reverse drive gear, further comprising:

an output shaft;

gearing defining multiple gear pairs, the gears of a pair being carried on the output shaft and on the countershaft;

a second synchronizer unit for selectively driveably connecting one gear of a gear pair to the output shaft having a reverse drive gear formed thereon;

a second shift fork for moving the second synchronizer and thereby connecting the selected gear to the output shaft, having a groove located for engagement by the selector finger and by the locking wheel.

4. The mechanism of claim 1 comprising a spring located between the bracket arm and the shift fork so that axial movement of the arm and the fork toward one another is opposed by the force of the spring and wherein the stop means includes a stop surface formed on the transmission housing cover for limiting axial displacement of the gear selector shaft in the direction of the spring force that is developed on the shift fork.

5. The mechanism of claim 4 wherein the stop means further includes a stop surface formed on the shift fork for limiting axial displacement of the gear selector shaft in the direction opposite the direction of the spring force that is developed on the shift fork.

* * * * *